(12) United States Patent
Johnson et al.

(10) Patent No.: US 9,215,841 B2
(45) Date of Patent: Dec. 22, 2015

(54) SEED INDUCTOR FOR AN AGRICULTURAL IMPLEMENT HAVING AN ADJUSTABLE AIR BYPASS

(71) Applicant: CNH America LLC, New Holland, PA (US)

(72) Inventors: Chad M. Johnson, Arlington Heights, IL (US); Frank C. Legner, III, Odell, IL (US); Marvin A. Prickel, Homer Glen, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 139 days.

(21) Appl. No.: 13/737,873

(22) Filed: Jan. 9, 2013

(65) Prior Publication Data

US 2014/0193214 A1 Jul. 10, 2014

(51) Int. Cl.
*B65G 53/36* (2006.01)
*A01C 7/08* (2006.01)

(52) U.S. Cl.
CPC ...................................... *A01C 7/081* (2013.01)

(58) Field of Classification Search
CPC ......... A01C 7/081; A01C 7/082; A01C 7/084
USPC .............. 406/86, 95, 144, 153; 111/174–176
See application file for complete search history.

(56) References Cited

U.S. PATENT DOCUMENTS

| | | | | | |
|---|---|---|---|---|---|
| 2,764,111 | A | * | 9/1956 | Collins | 111/70 |
| 2,861,527 | A | * | 11/1958 | Phillips | 111/186 |
| 3,073,265 | A | * | 1/1963 | Movilla et al. | 111/109 |
| 3,490,654 | A | * | 1/1970 | Fischer | 406/123 |
| 3,633,522 | A | * | 1/1972 | Main | 111/69 |
| 4,060,181 | A | * | 11/1977 | Grataloup | 406/93 |
| 4,106,414 | A | * | 8/1978 | Vastag | 111/200 |
| 4,246,469 | A | * | 1/1981 | Merlo | 377/6 |
| 4,257,534 | A | * | 3/1981 | Williams | 222/1 |
| 4,280,419 | A | * | 7/1981 | Fischer | 111/174 |
| 4,296,695 | A | * | 10/1981 | Quanbeck | 111/186 |
| 4,453,866 | A | * | 6/1984 | Ryan | 406/70 |
| 4,669,922 | A | * | 6/1987 | Hooper et al. | 406/157 |
| 4,718,574 | A | * | 1/1988 | Schoenmaekers | 221/203 |
| 4,758,119 | A | * | 7/1988 | Frase et al. | 406/109 |
| 4,779,765 | A | * | 10/1988 | Neumeyer | 222/142 |
| 4,824,295 | A | * | 4/1989 | Sharpless | 406/109 |
| 5,133,270 | A | * | 7/1992 | Ledermann et al. | 111/130 |
| 5,161,473 | A | * | 11/1992 | Landphair et al. | 111/176 |
| 5,379,706 | A | * | 1/1995 | Gage et al. | 111/175 |
| 5,392,722 | A | * | 2/1995 | Snipes et al. | 111/174 |
| 5,402,741 | A | * | 4/1995 | Truax et al. | 111/172 |
| 5,826,523 | A | * | 10/1998 | Gregor | 111/181 |

(Continued)

*Primary Examiner* — Joseph Dillon, Jr.
(74) *Attorney, Agent, or Firm* — Rebecca L. Henkel

(57) ABSTRACT

A particulate material delivery system for an agricultural implement including, an inductor box configured to receive particulate material from a tank, the inductor box including, an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber, and an airflow control device in communication with the inductor segment and configured to control the airflow through the air bypass channel.

12 Claims, 8 Drawing Sheets

(56) References Cited

U.S. PATENT DOCUMENTS

| | | | |
|---|---|---|---|
| 5,931,105 A * | 8/1999 | Luxon | 111/170 |
| 5,939,356 A * | 8/1999 | Wellinghoff | 504/100 |
| 5,947,040 A | 9/1999 | Gregor | |
| 5,979,343 A | 11/1999 | Gregor et al. | |
| 5,996,516 A | 12/1999 | Benneweis et al. | |
| 6,047,652 A * | 4/2000 | Prairie et al. | 111/174 |
| 6,089,478 A * | 7/2000 | Truan et al. | 239/675 |
| 6,148,748 A * | 11/2000 | Bardi et al. | 111/174 |
| 6,164,222 A * | 12/2000 | Mayerle et al. | 111/175 |
| 6,192,813 B1 | 2/2001 | Memory et al. | |
| 6,213,690 B1 | 4/2001 | Gregor et al. | |
| 6,253,693 B1 * | 7/2001 | Mayerle et al. | 111/174 |
| 6,267,067 B1 * | 7/2001 | Mayerle et al. | 111/170 |
| 6,273,648 B1 * | 8/2001 | Poncelet et al. | 406/181 |
| 6,289,830 B2 | 9/2001 | Mayerle et al. | |
| 6,290,433 B2 * | 9/2001 | Poncelet et al. | 406/181 |
| 6,298,797 B1 * | 10/2001 | Mayerle et al. | 111/175 |
| 6,564,730 B2 * | 5/2003 | Crabb et al. | 111/185 |
| 6,595,148 B2 * | 7/2003 | Meyer et al. | 111/63 |
| 6,609,468 B1 * | 8/2003 | Meyer et al. | 111/174 |
| 6,644,225 B2 | 11/2003 | Keaton | |
| 6,666,156 B1 * | 12/2003 | Mayerle et al. | 111/150 |
| 6,668,738 B2 * | 12/2003 | Lee et al. | 111/175 |
| 6,675,728 B2 * | 1/2004 | Lee et al. | 111/63 |
| 6,688,244 B1 * | 2/2004 | Meyer et al. | 111/174 |
| 6,725,788 B2 * | 4/2004 | McCartney et al. | 111/175 |
| 6,776,108 B2 * | 8/2004 | Crabb et al. | 111/185 |
| 6,883,445 B2 * | 4/2005 | Mayerle | 111/175 |
| 6,928,941 B1 * | 8/2005 | Sternitzke | 111/181 |
| 7,025,010 B2 * | 4/2006 | Martin et al. | 111/175 |
| 7,093,547 B2 * | 8/2006 | Mayerle | 111/174 |
| 7,182,029 B2 | 2/2007 | Johnson et al. | |
| 7,213,525 B2 * | 5/2007 | Meyer et al. | 111/174 |
| 7,264,423 B2 * | 9/2007 | Kowalchuk | 406/181 |
| 7,267,061 B2 * | 9/2007 | Mayerle | 111/174 |
| 7,334,532 B2 * | 2/2008 | Sauder et al. | 111/185 |
| 7,353,760 B2 | 4/2008 | Mayerle et al. | |
| 7,413,387 B2 * | 8/2008 | Pleyer | 406/41 |
| 7,462,002 B2 | 12/2008 | Mayerle | |
| 7,640,877 B1 * | 1/2010 | Memory | 111/174 |
| 7,647,875 B2 * | 1/2010 | Landphair et al. | 111/172 |
| 7,669,538 B2 | 3/2010 | Memory et al. | |
| 7,690,440 B2 * | 4/2010 | Dean et al. | 172/179 |
| 7,752,984 B2 * | 7/2010 | Memory | 111/176 |
| 7,779,769 B2 | 8/2010 | Memory | |
| 7,779,770 B2 * | 8/2010 | Sauder et al. | 111/185 |
| 7,806,061 B2 * | 10/2010 | Memory | 111/123 |
| 7,866,269 B2 * | 1/2011 | Naylor et al. | 111/174 |
| 8,033,230 B2 * | 10/2011 | Naylor et al. | 111/176 |
| 8,079,317 B2 * | 12/2011 | Anderson et al. | 111/175 |
| 8,234,987 B2 * | 8/2012 | Georgison et al. | 111/176 |
| 8,448,585 B2 * | 5/2013 | Wilhelmi et al. | 111/175 |
| 2001/0013309 A1 * | 8/2001 | Mayerle et al. | 111/174 |
| 2004/0163578 A1 * | 8/2004 | McDonald et al. | 111/175 |
| 2004/0206283 A1 * | 10/2004 | Mayerle | 111/130 |
| 2008/0018970 A1 * | 1/2008 | Miyanagi et al. | 359/197 |
| 2008/0105445 A1 * | 5/2008 | Dayton et al. | 172/105 |
| 2008/0295751 A1 * | 12/2008 | Shoup et al. | 111/174 |
| 2010/0017073 A1 | 1/2010 | Landphair | |
| 2010/0037807 A1 * | 2/2010 | Henning et al. | 111/84 |
| 2010/0326339 A1 * | 12/2010 | Georgison et al. | 111/175 |
| 2011/0162566 A1 * | 7/2011 | Wilhelmi et al. | 111/200 |
| 2011/0282556 A1 * | 11/2011 | Klenz et al. | 701/50 |
| 2012/0036914 A1 * | 2/2012 | Landphair et al. | 73/1.16 |
| 2012/0042815 A1 | 2/2012 | Wonderlich | |
| 2012/0174843 A1 | 7/2012 | Friggstad | |
| 2012/0174844 A1 * | 7/2012 | Friggstad | 111/175 |
| 2012/0272881 A1 * | 11/2012 | Georgison et al. | 111/175 |
| 2014/0190378 A1 * | 7/2014 | Johnson et al. | 111/174 |
| 2014/0190379 A1 * | 7/2014 | Johnson et al. | 111/174 |
| 2014/0190380 A1 * | 7/2014 | MacDonald et al. | 111/174 |
| 2014/0193211 A1 * | 7/2014 | Connors et al. | 406/117 |
| 2014/0193212 A1 * | 7/2014 | Johnson et al. | 406/122 |
| 2014/0193213 A1 * | 7/2014 | Johnson et al. | 406/122 |
| 2014/0193215 A1 * | 7/2014 | Connors et al. | 406/136 |
| 2014/0261116 A1 * | 9/2014 | Redman et al. | 111/174 |

* cited by examiner

US 9,215,841 B2

SEED INDUCTOR FOR AN AGRICULTURAL IMPLEMENT HAVING AN ADJUSTABLE AIR BYPASS

BACKGROUND

The invention relates generally to ground working equipment, such as agricultural equipment, and more specifically, to an inductor box for a pneumatic distribution system of an agricultural implement.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. In certain configurations, a gauge wheel is positioned a vertical distance above the opener to establish a desired trench depth for seed deposition into the soil. As the implement travels across a field, the opener excavates a trench into the soil, and seeds are deposited into the trench. In certain row units, the opener is followed by a packer wheel that packs the soil on top of the deposited seeds.

Certain planting implements include a remote seed tank, and a pneumatic distribution system configured to convey seeds from the tank to each row unit. For example, the pneumatic distribution system may include an inductor box positioned beneath the seed tank. The inductor box is configured to receive seeds from the tank, to fluidize the seeds into an air/seed mixture, and to distribute the air/seed mixture to the row units via a network of pneumatic hoses/conduits. Each row unit, in turn, receives the seeds from the pneumatic hoses/conduits, and directs the seeds to a metering system. The metering system is configured to provide a flow of seeds to a seed tube for deposition into the soil. By operating the metering system at a particular speed, a desired seed spacing may be established as the implement traverses a field.

BRIEF DESCRIPTION

In one embodiment, a particulate material delivery system for an agricultural implement including, an inductor box configured to receive particulate material from a tank, the inductor box including, an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber, and an airflow control device in communication with the inductor segment and configured to control the airflow through the air bypass channel.

In another embodiment, a particulate material delivery system for an agricultural implement including, an inductor box including, a particulate material supply chamber configured to receive particulate material from a particulate material source, an air supply chamber configured to receive airflow from an airflow supply for use in conveying particulate material through the inductor box, and an air bypass channel configured to guide airflow from the air supply chamber through the particulate material supply chamber without interacting with a flow of the particulate material through the particulate material supply chamber, and an airflow control device configured to control the airflow through the air bypass channel.

In a further embodiment, a particulate material delivery system for an agricultural implement including, an inductor segment including, a particulate material supply chamber configured to receive particulate material from a particulate material tank and a first airflow from an air source, a particulate material delivery chamber configured to receive the particulate material from the particulate material fluidization chamber and to distribute the particulate material to at least one row unit, an air bypass channel extending through the particulate material supply chamber and configured to direct a second airflow through the particulate material supply chamber and into the particulate material delivery chamber without interacting with the particulate material in the particulate material supply chamber, and an airflow control device configured to control the airflow through the air bypass channel.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
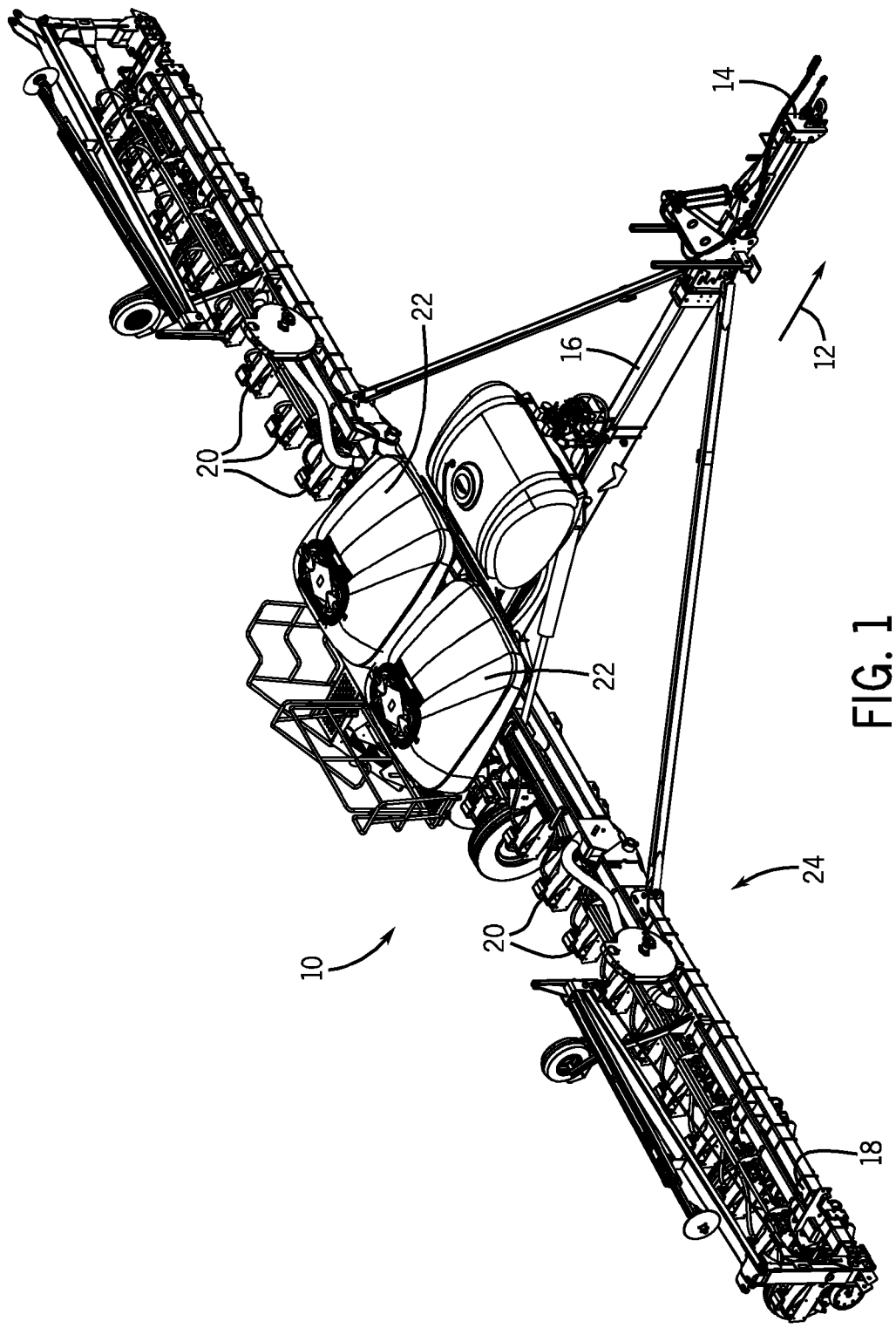
FIG. 1 is a perspective view of an embodiment of an agricultural implement configured to deposit particulate material into a soil surface.

FIG. 1 is a perspective view of an embodiment of an agricultural implement 10 configured to deposit particulate material into a soil surface. In the illustrated embodiment, the implement 10 is configured to be towed along a direction of travel 12 by a work vehicle, such as a tractor or other prime mover. The work vehicle may be coupled to the implement 10 by a hitch assembly 14. As illustrated, the hitch assembly 14 is coupled to a main frame assembly 16 of the implement 10 to facilitate towing of the implement 10 in the direction of travel 12. In the illustrated embodiment, the frame assembly 16 is coupled to a tool bar 18 that supports multiple row units 20. Each row unit 20 is configured to deposit particulate material (e.g., seeds) at a desired depth beneath the soil surface, thereby establishing rows of planted seeds. The implement 10 also includes particulate material tanks 22, and a pneumatic distribution system 24 configured to convey particulate material from the tanks to the row units 20. In certain embodiments, the pneumatic distribution system includes an inductor box positioned beneath each particulate material tank 22. Each inductor box is configured to receive particulate material from a respective tank, to fluidize the particulate material into an air-particulate material mixture, and to distribute the air-particulate material mixture to the row units 20 via a network of pneumatic hoses/conduits (i.e., the pneumatic distribution system 24).

In certain embodiments, each row unit 20 includes a residue manager, an opening assembly, a particulate material tube, closing discs, and a press wheel. The residue manager includes a rotating wheel having multiple tillage points or fingers that break up crop residue, thereby preparing the soil for particulate material deposition. The opening assembly includes a gauge wheel and an opener disc. The gauge wheel may be positioned a vertical distance above the opener disc to establish a desired trench depth for particulate material deposition into the soil. As the row unit travels across a field, the opener disc excavates a trench into the soil for particulate material deposition. The particulate material tube, which may be positioned behind the opening assembly, directs a particulate material from a metering system into the excavated trench. The closing discs then direct the excavated soil into the trench to cover the planted particulate material. Finally, the press wheel packs the soil on top of the particulate material with a desired pressure.

While the illustrated implement 10 includes 24 row units 20, it should be appreciated that alternative implements may include more or fewer row units 20. For example, certain implements 10 may include 6, 8, 12, 16, 24, 32, or 36 row units, or more. In addition, the spacing between row units may be particularly selected based on the type of crop being planting. For example, the row units may be spaced 30 inches from one another for planting corn, and 15 inches from one another for planting soy beans.

As mentioned above, the pneumatic distribution system 24 includes an inductor box configured to receive particulate material (e.g., seeds) from a respective tank. Depending on the desired application, the pneumatic distribution system may distribute a wide variety of seeds (e.g., light seeds, heavy seeds, large seeds, small seeds, etc). The inductor box fluidizes the particulate material from the tank 22 into an air-particulate material mixture for distribution to the row units 20 through a network of pneumatic hoses/conduits. As illustrated in FIG. 1, the row units 20 are positioned at different distances from the tanks 22. The varying distances between the row units 20 and the tanks 22 varies the flow of particulate material through the pneumatic distribution system 24. For example, the flow path may be shorter for row units near the inductor box, and larger for row units farther from the inductor box. Accordingly, the pneumatic distribution system 24 may include an airflow control device(s) to control particulate material flow through the inductor box. By controlling the airflow through the inductor box, the airflow control device(s) establishes a desired particulate material flow to each of the row units 20, thereby reducing the possibility of starvation and/or overfilling of the row units.

Figure 2:
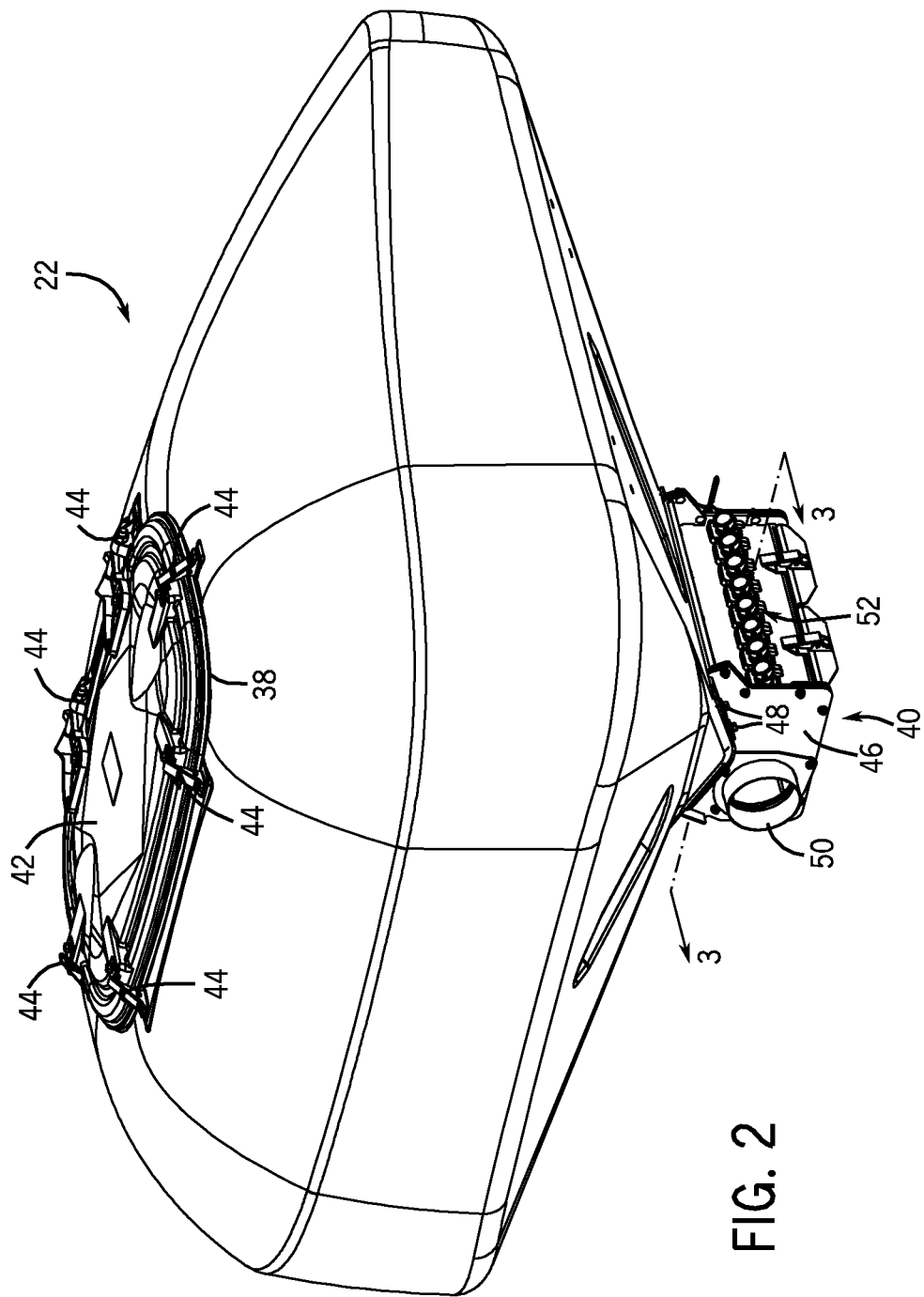
FIG. 2 is a perspective view of an embodiment of a particulate material tank coupled to an inductor box.

FIG. 2 is a perspective view of an embodiment of a particulate material tank 22 coupled to an inductor box 40. The particulate material tank 22 includes an opening 38 for receiving particulate material (e.g., seeds, etc.) for storage in the tank 22. The tank 22 secures the particulate material inside using a lid 42 that selectively covers the opening 38. The lid 42 securely attaches to the tank 22 with multiple fasteners 44. On the opposite side of the tank 22 from the lid is the inductor box 40. The inductor box 40 attaches to the bottom of the tank 22 and receives gravity fed particulate material for fluidization. The inductor box 40 includes a housing 46 that is coupled to the tank 22 with bolts 48. Moreover, the inductor box 40 includes an air supply port 50, and multiple inductor segments 52. It is through the air supply port 50 that the inductor box 40 receives airflow from an air supply (e.g., a fan, a blower, etc.). The airflow from the air supply enables the inductor box 40 to fluidize the particulate material and to pressurize the tank 22. In some embodiments, the tank 22 may be made of a flexible material that expands when pressurized with airflow from the air supply. As will be explained in greater detail below, the inductor box 40 controls airflow from the air supply into a series of air pathways with an air control device(s). The airflow control device(s) controls particulate material flow from the inductor segments 52 to the row units 20, thus reducing overfilling or underfilling the row units 20.

Figure 3:
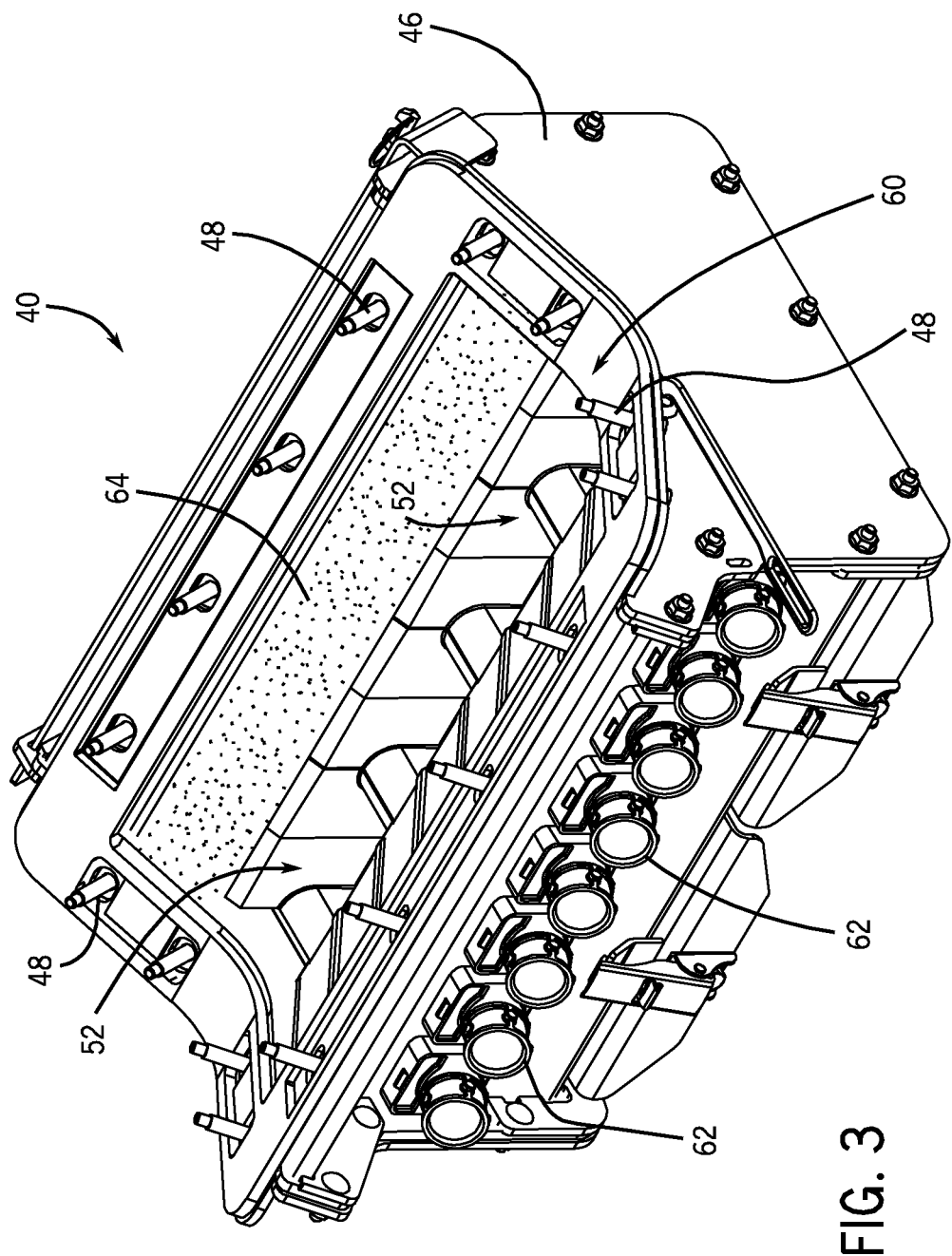
FIG. 3 is a perspective view of an embodiment of an inductor box.

FIG. 3 is a perspective view of an embodiment of an inductor box 40. As illustrated, the inductor box 40 includes multiple inductor segments 52 disposed within a chamber 60 formed by the inductor box housing 46. In the illustrated embodiment, there are eight inductor segments 52. However, other embodiments may include a different number of inductor segments 52 (e.g., 1, 2, 3, 4, 5, 6, 7, 8, 9, 10, or more). As mentioned above, the particulate material enters the inductor segments 52 from the tank and the particulate material is fluidized (i.e., mixed with air). Once the particulate material is fluidized, the air-particulate material mixture exits the inductor box 40 through particulate material delivery ports 62 in the inductor segments 52.

Figure 4:
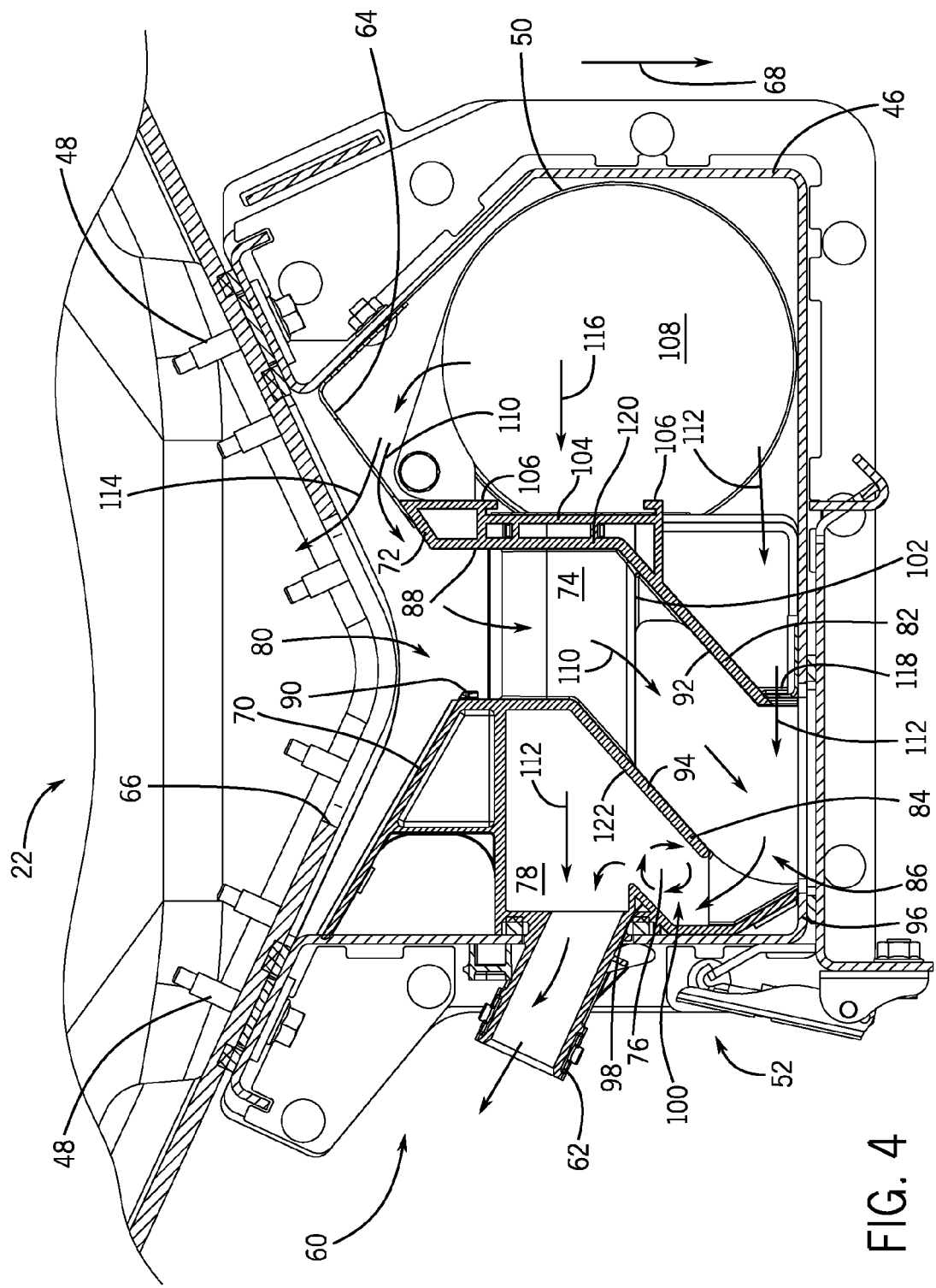
FIG. 4 is a cross-sectional side view of an embodiment of an inductor box.

FIG. 4 is a cross-sectional side view of an embodiment of an inductor box 40 coupled to the tank 22. As illustrated, the inductor box 40 is coupled to the tank 22 with bolts 48. The inductor box 40 surrounds a particulate material outlet(s) 66 of the tank 22, thereby enabling particulate material to exit the tank 22 and enter the inductor box 40. More specifically, as the particulate material exits the tank 22, in a direction 68, the particulate material enters the inductor segment(s) 52. As explained above, the inductor box 40 includes an inductor segment 52 disposed within the inductor box chamber 60. The top of the inductor segment 52 includes two surfaces 70 and 72. The surfaces 70 and 72 may be angled to facilitate flow of particulate material into the inductor segment 52. As particulate material travels through the inductor segment 52, the particulate material passes through a series of chambers before exiting through the particulate material delivery port 62. The chambers in the inductor segment 52 include a particulate material supply chamber 74, a fluidization chamber 76, and a particulate material delivery chamber 78.

The angled surfaces 70 and 72 channel the particulate material from the tank 22 into the particulate material supply chamber 74 through a particulate material supply chamber inlet 80. The particulate material supply chamber 74 guides the particulate material from the particulate material supply chamber inlet 80 to the particulate material supply chamber outlet 86 via a first wall 82 and a second wall 84. As illustrated, the walls 82 and 84 include respective vertical portions 88 and 90, as well as respective angled portions 92 and 94. As the particulate material flows through the particulate material supply chamber 74, the angled portions 92 and 94 of the walls 82 and 84 direct the particulate material toward the particulate material supply chamber outlet 86 at a base 96 of the inductor box 40.

Airflow from the air supply then conveys the particulate material through the particulate material supply chamber outlet 86 and into the fluidization chamber 76. The fluidization chamber 76 includes a first wall 98 and shares the second wall 84 of the particulate material supply chamber 74. In order to fluidize the particulate material, the fluidization chamber 76 creates a vortex 100 between the walls 98 and 84. The vortex 100 separates and mixes the particulate material with the airflow (i.e., the vortex 100 enables the particulate material to fluidize) before the particulate material flows to the particulate material delivery chamber 78. When the airflow through fluidization chamber 76 reaches a sufficient level the particulate material is carried out of the fluidization chamber 76 and into the particulate material delivery chamber 78. At that point more particulate material is allowed to flow into the fluidization chamber 76. In the particulate material delivery chamber 78, airflow from an air bypass channel 102 and airflow from the fluidization chamber 76 conveys the particulate material out of the particulate material delivery chamber 78, through the particulate material delivery port 62, and to the row units 20. In some embodiments, the inductor box 40 includes an airflow control device 104 that controls the particulate material flow through the inductor segment 52. In the present embodiment, the airflow control device 104 is a baffle. However, in other embodiments, the airflow control device 104 may be a plug. As illustrated, the airflow control device 104 may couple to the inductor segment 52 with retention features 106. As will be explained in more detail below, the airflow control device 104 may control airflow through each of the air bypass channels 102, and thus the flow of particulate material out of each inductor segment 52.

As explained above, the inductor box 40 includes the air supply port 50 for receiving airflow from an air supply that pressurizes the tank 22 and conveys particulate material through the inductor segment 52. The airflow from the air supply passes through the air supply port 50 and enters an air supply chamber 108. The air supply chamber 108 extends through the inductor box 40 in a generally perpendicular direction to the flow path through the inductor segments 52, thereby supplying each inductor segment 52 with airflow.

The air supply chamber 108 divides the airflow from the air supply into four airflow paths numbered 110, 112, 114, and 116. The first airflow path 110 passes through the first screen 64 and enters the particulate material supply chamber 74. As the airflow through the first airflow path 110 enters the particulate material supply chamber 74, the airflow engages the particulate material and urges the particulate material in the direction 68. For example, when using light particulate material (e.g., sunflower seeds, sweet corn seeds), the airflow through the airflow path 110 reduces blockage of the particulate material supply chamber 74 by providing additional force (in addition to gravity) to move the particulate material through the particulate material supply chamber 74.

While the airflow through the first airflow path 110 facilitates urging the particulate material in the direction 68 through the particulate material supply chamber 74, the airflow through the second airflow path 112 conveys the particulate material out of the particulate material supply chamber 74 and into the fluidization chamber 76. The airflow through the second airflow path 112 flows through a second screen 118. The second screen 118 is coupled to the first wall 82 and to the base 96 of the inductor box 40. The second screen 118, like the first screen 64, blocks the particulate material from entering the air supply chamber 108.

A third airflow path 114 flows through the first screen 64 and into the tank 22. The airflow in the third airflow path 114 pressurizes and expands the tank 22. However, in some embodiments, the lid 42 may not create a fluid tight seal with the tank 22. Accordingly, airflow in the third airflow path 114 may provide continuous airflow into the tank 22 to replace pressurized air lost through leaks in the lid 42. As a result, airflow from the first airflow path 110 is able to flow through the particulate material supply chamber 74, and the airflow in the second airflow path 112 is able to convey the particulate material into the fluidization chamber 76. In other words, the airflow in the third airflow path 114 pressurizes the tank 22, thus equalizing pressure within the system.

The airflow in the fourth airflow path 116 flows from the air supply chamber 108 through the air bypass channel 102 and into the particulate material delivery chamber 78. The air bypass channel 102 is disposed within the particulate material supply chamber 74 and extends between the first particulate material supply chamber wall 82 and the second particulate material supply chamber wall 84. The walls 82 and 84 include respective apertures 120 and 122 that enable the airflow of the fourth airflow path 116 to pass through the air bypass channel 102. The air bypass channel 102 is oriented in a generally crosswise direction to the particulate material flow through the particulate material supply chamber 74 and is substantially in line with the particulate material delivery port 62. Moreover, the air bypass channel 102 is positioned above the fluidization chamber 76 to enable the airflow from the fourth airflow path 116 to urge the particulate material exiting the fluidization chamber 76 into the particulate material delivery port 62 for delivery to the row units 20.

As explained above, the airflow from the air supply chamber 108 is divided into four airflow paths numbered 110, 112, 114, and 116. The first airflow path 110, second airflow path 112, and the fourth airflow path 116 flow through the inductor segment. The flow rate of the airflow through anyone of these three airflow paths (i.e., 110, 112, and 116) affects the flow rate of the airflow through the remaining airflow paths in the inductor segment. For example, decreasing the flow rate of the airflow through the fourth airflow path 116 increases the flow rate of the airflow through the first airflow path 110 and the second airflow path 112. As a result, the first airflow path 110 and the second airflow path 112 convey more particulate material through the inductor segments 52 to the row units 20. Similarly, increasing the flow rate of the airflow through the fourth airflow path 116 will decrease the airflow flowing through the first airflow path 110 and the second airflow path 112. The decrease in the airflow through the first airflow path 110 and the second airflow path 112 will reduce the particulate material movement through the inductor segments 52 to the row units 20.

Figure 5:
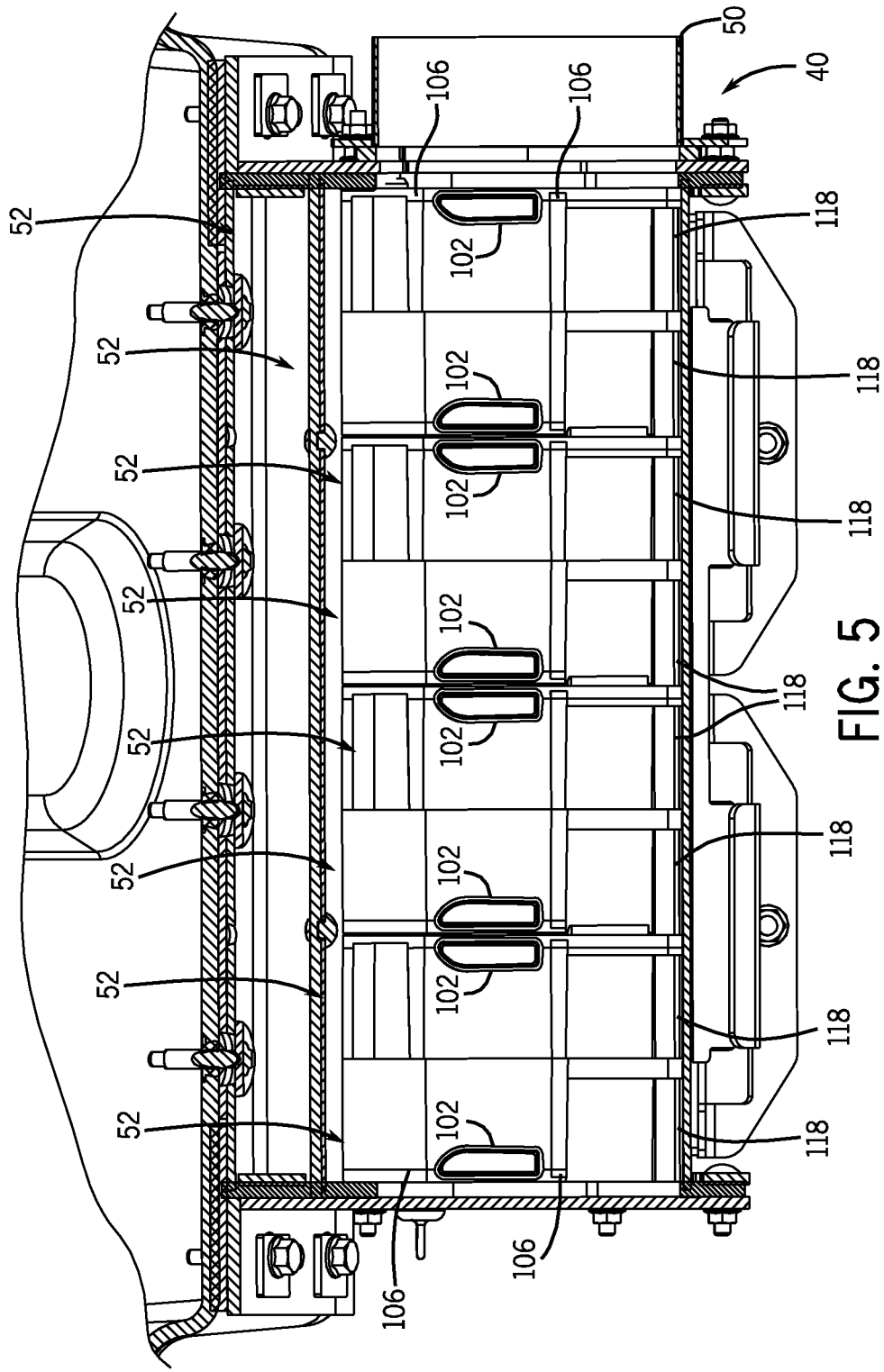
FIG. 5 is a cross-sectional rear view of an embodiment of an inductor box.

FIG. 5 is a rear cross-sectional view of an embodiment of an inductor box 40 with multiple inductor segments 52. Each of the inductor segments 52 delivers particulate material to one or more row units 20. In the present embodiment, there are eight inductor segments 52. However, different embodiments may include different numbers of inductor segments (e.g., 1, 2, 3, 4, 5, 6, 7, 8, 9, 10, or more inductor segments). In the present embodiment, the inductor box 40 does not include an airflow control device. Accordingly, particulate material flow will be generally equal through each of the inductor segments 52 assuming an equal amount of backpressure from each of the delivery conduits (i.e., each conduit is the same length and has the same cross sectional area).

Figure 6:
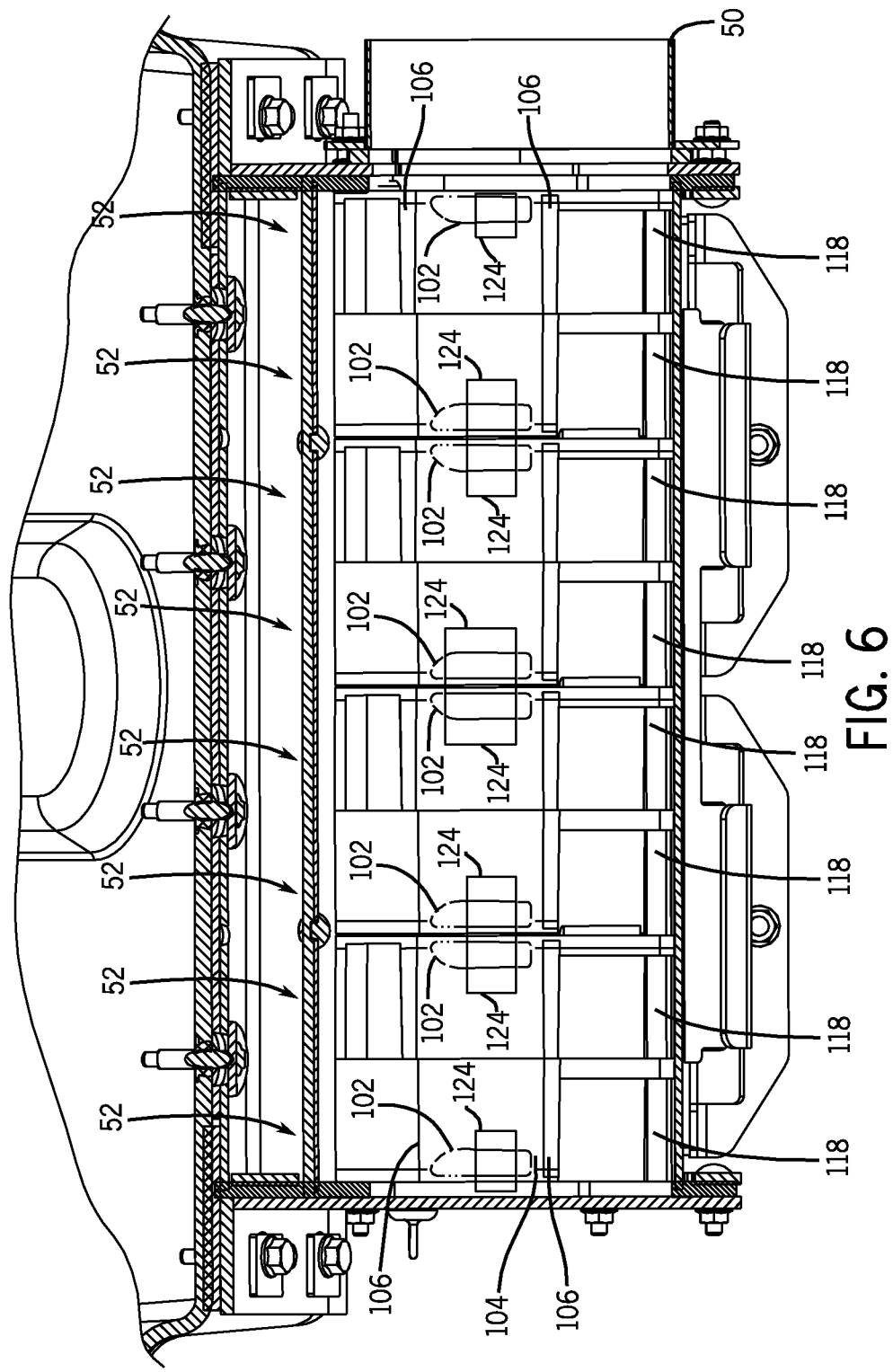
FIG. 6 is a cross-sectional rear view of an embodiment of an inductor box with an airflow control device.
Figure 7:
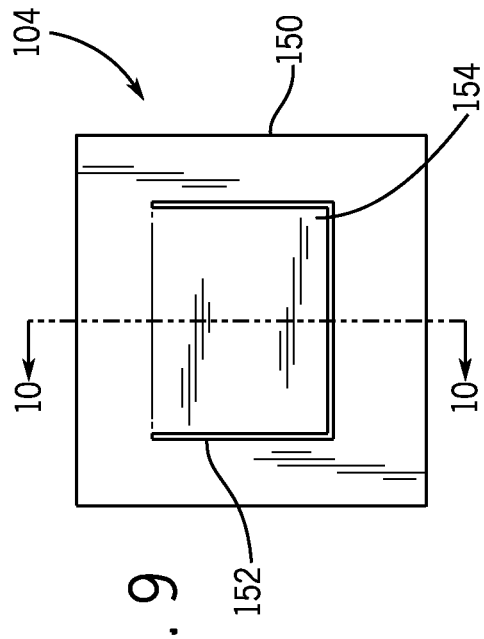
FIG. 7 is a front view of an embodiment of an airflow control device.
Figure 9:
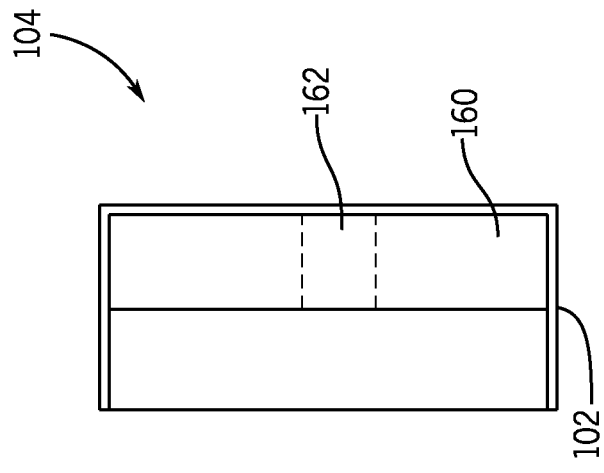
FIG. 9 is a front view of another embodiment of an airflow control device.
Figure 10:
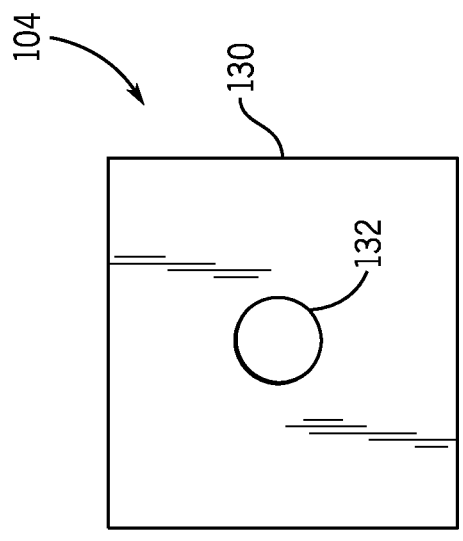
FIG. 10 is a cross-sectional side view of the airflow control device of FIG. 9, taken along line 10-10.
Figure 11:
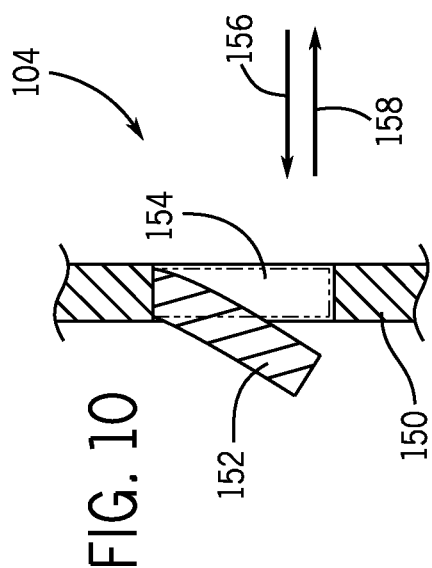
FIG. 11 is a front view of an embodiment of an airflow control device within an air bypass channel.
Figure 8:
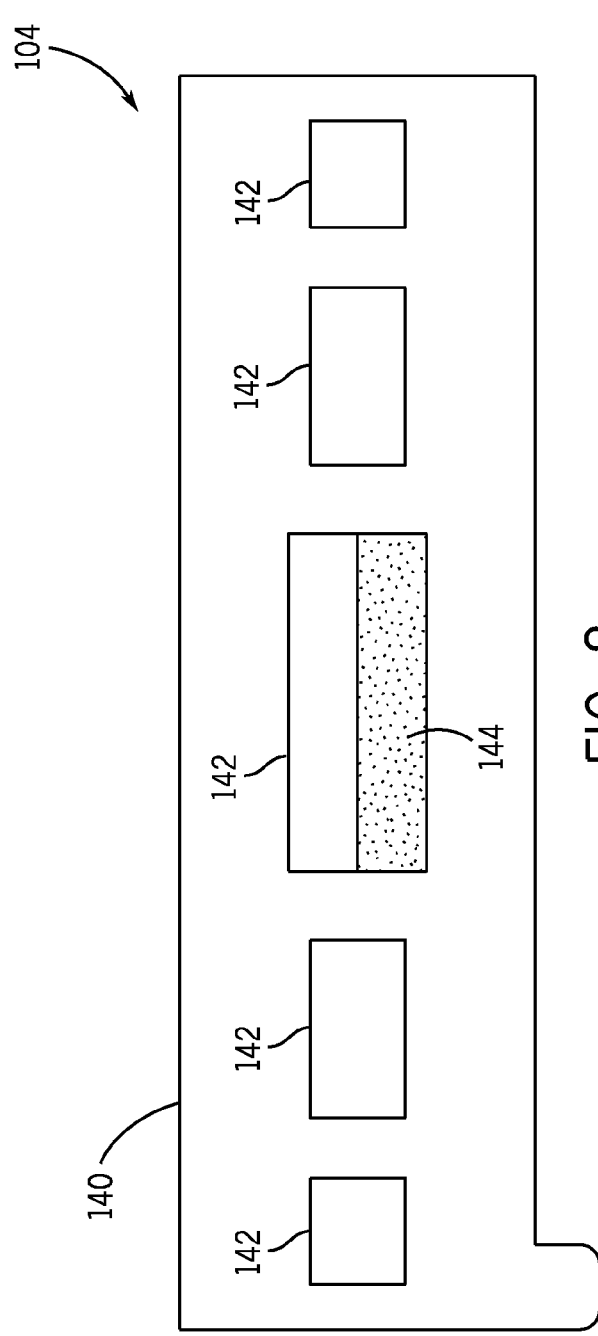
FIG. 8 is a front view of another embodiment of an airflow control device.

FIG. 6 is a rear cross-sectional view of an embodiment of an inductor box 40 with an airflow control device 104 positioned adjacent to the air bypass channels 102 in each of the inductor segments 52. As explained above, the row units 20 are positioned at different distances from the inductor box 40. The varying distances between the row units 20 and the inductor box 40 affects the flow rate of particulate material through the pneumatic distribution system 24. Accordingly, by controlling the airflow through the inductor box, the airflow control device 104 controls the flow of particulate material to the row units 20, which reduces the possibility of starvation and/or overfilling the row units with particulate material. In the present embodiment, the airflow control device 104 is a baffle with multiple apertures 124. As illustrated, the apertures 124 differ in size. The size of the apertures 124 is selected such that each row unit 20 receives an approximately equal flow rate of particulate material from a corresponding inductor segment 52. For example, the apertures 124 in the flow control device 104 will be larger for inductor segments 52 that send particulate material to row units 20 closer to the inductor box 40. The increase in airflow through the air bypass channel 102 reduces the airflow through the second airflow path 110 and the third airflow path 112, which decreases particulate material flow rates through inductor segments 52 that feed the row units 20, thereby reducing the possibility of the row units overfilling. Likewise, the apertures 124 in the airflow control device 104 will be smaller for inductor segments 52 that send particulate material to row units 20 farther away from the inductor box 40. The decrease in airflow through the air bypass channel 102 increases the airflow through the second airflow path 110 and the third airflow path 112, which increases particulate material flow rates through inductor segments 52 that feed the row units 20 further away from the inductor box 40, preventing the row units 20 from starving. In the present embodiment, the size of the apertures 124 increase toward the center of the air control device 102. However, different embodiments may have a different arrangement (e.g., apertures 124 that increase in size from left to right, apertures 124 that increase in size from right to left, apertures 124 that decrease in size from the center out, or apertures 124 that may alternate in size across the air flow control device 104). The aperture sizes and arrangement depend on which inductor segments 52 feed each row unit 20 and the distance between each row unit 20 and the inductor box 40.

FIG. 7 is a front view of an embodiment of an airflow control device 104. In the present embodiment, the airflow control device 104 is a baffle 130. The baffle 130 restricts airflow through a single inductor segment 52. The baffle 130 includes a circular aperture 132 that enables airflow to pass through the baffle 130 and into an air bypass channel 102. In other embodiments, the baffle 130 may include more than one aperture (e.g., 1, 2, 3, 4, 5, or more apertures) and form different shapes depending on the desired particulate material flow rates through a particular inductor segment 52. Accordingly, embodiments with multiple inductor segments 52 may include multiple corresponding baffles 130 having different numbers and/or sizes of apertures 132.

FIG. 8 is a front view of an embodiment of an airflow control device 104. As illustrated, the airflow control device 104 is a baffle 140 with multiple apertures 142. As explained above, the distance between the inductor box 40 and the row units 20 affects the flow of particulate material through the pneumatic distribution system 24. Accordingly, the apertures 142 increase or decrease airflow to different inductor segments 52 depending on which row units 20 the inductor segments 52 feed. In the present embodiment, the size of the apertures 142 increases toward the center of the air flow control device 104. However, different embodiments may have a different arrangement (e.g., apertures 142 that increase in size from left to right, apertures 142 that increase in size from right to left, apertures 124 that decrease in size from the center out, or apertures 142 that may alternate in size across the air flow control device 104). The aperture sizes and arrangement on the baffle 140 depend on which inductor segments 52 feed each row unit 20 and the distance between the row units 20 and the inductor box 40. Moreover, some or all of the apertures 142 may include a screen 144. The screen 144 enables airflow to pass through but blocks particulate material from back-flowing through the air bypass channel 102 and entering the air supply chamber 108. Accordingly, the baffle 140 may serve two functions. First, the baffle 140 may control airflow through the air bypass channels 102 with the apertures 142, thereby influencing particulate material flow through the inductor segments 52. Second, the baffle 140 may block or limit particulate material from backflowing through the air bypass channel 102 and entering the air supply chamber 108.

FIG. 9 is a front view of an embodiment of an airflow control device 104. In the present embodiment, the airflow control device 104 is a flapper baffle 150. The flapper baffle 150 includes a flap 152 that rests within an aperture 154. In the present embodiment, the flapper baffle 150 controls airflow through a single inductor segment 52. However, in other embodiments, a large baffle may include multiple apertures 154 with respective flaps 152. For example, a single flapper baffle 150 may include 1, 2, 3, 4, 5, 6, 7, 8, 9, 10, or more apertures 154 with corresponding flaps 152, depending on the number of inductor segments 52. Moreover, each of the apertures 154 may vary in size depending on the desired airflow through a particulate inductor segment 52.

FIG. 10 is a cross-sectional side view of an embodiment of the flapper baffle 150. During operation, airflow in the direction 156 induces the flap 152 to move in the direction 156, thereby opening the aperture 154 and enabling airflow to pass through the air bypass channel(s) 102. When the airflow stops, the flap 152 moves in the direction 158 and returns to a position of rest within the aperture 154, thereby blocking flow in the direction 158.

FIG. 11 is a front view of an embodiment of an airflow control device 104 within an air bypass channel 102. In the present embodiment, the airflow control device 104 is a plug 160. The plug 160 rests within the air bypass channel 102 and includes an aperture 162 to control airflow. The plug 160 may control airflow through the air bypass channel 102 by varying the size of the aperture 162 (i.e., increasing or decreasing the size of the aperture 162), or by including additional apertures 162 (e.g., 1, 2, 3, 4, 5, or more apertures). As explained above, the inductor segments 52 feed different row units 20 at different distances from the inductor box 40. Accordingly, the aperture(s) 162 in the plug 160 may be selected to control airflow through the bypass channel 102 of a corresponding inductor segment, which increases or decreases the flow of particulate material through the inductor segment 52.

Figure 12:
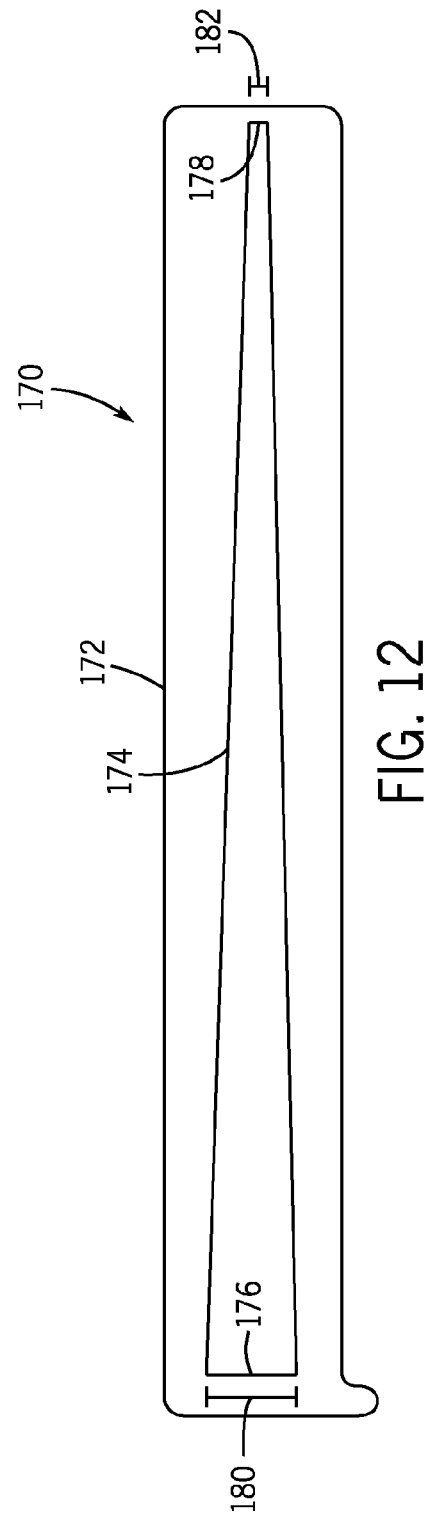
FIG. 12 is a front view of another embodiment of an airflow control device.

FIG. 12 is a front view of an embodiment of an airflow control device 170. As illustrated, the airflow control device 170 is a baffle 172 with an aperture 174. As explained above, the distance between the inductor box 40 and the row units 20 affects the flow of particulate material through the pneumatic distribution system 24. Accordingly, the aperture 174 may vary in size from a first end 176 to a second end 178. For example, the first end 176 may define an aperture width 180 and the second end 178 may define an aperture width 182. As illustrated, the aperture 174 may taper between the first end 176 with an aperture width 180 that is greater than the width 182 on the second end 178. In another embodiment, the aperture 174 may taper between the second end 178 with the aperture width 182 that is greater than the width 180 on the first end 176. In still other embodiments, the aperture 174 may have equal aperture widths 180 and 182 that do not change between the first end 176 and the second end 178, creating a uniform aperture opening. However, in other embodiments the width of the aperture 174 may increase and decrease from the first end to the second end (e.g., the aperture 174 may form an hourglass shape, pear-shape, diamond shape, etc.). Accordingly, with a single aperture 174 the airflow control device 170 may vary the airflow to different inductor segments 52 depending on which row units 20 the inductor segments 52 feed.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A particulate material delivery system for an agricultural implement comprising:
    an inductor box configured to receive particulate material from a tank, the inductor box comprising:
        an inductor segment comprising an air bypass channel extending through a particulate material supply chamber, wherein the particulate material supply chamber is configured to receive the particulate material for distribution to at least one row unit, and the air bypass channel is configured to guide airflow through the particulate material supply chamber without interacting with a flow of the particulate material through the particulate material supply chamber; and
    an airflow control device in communication with the inductor segment and configured to control the airflow through the air bypass channel.

2. The particulate material delivery system of claim 1, wherein the air bypass channel includes an inlet and an outlet.

3. The particulate material delivery system of claim 2, wherein the airflow control device is positioned adjacent to the inlet.

4. The particulate material delivery system of claim 3, wherein the airflow control device includes one or more apertures configured to facilitate airflow through the airflow control device and into the air bypass channel.

5. The particulate material delivery system of claim 1, wherein the inductor box includes a plurality of inductor segments each having a respective air bypass channel, and each air bypass channel having a respective inlet and a respective outlet.

6. The particulate material delivery system of claim 5, comprising a plurality of airflow control devices each positioned adjacent to a respective inlet.

7. The particulate material delivery system of claim 5, wherein a single airflow control device is positioned adjacent to a respective inlet.

8. The particulate material delivery system of claim 6, wherein the plurality of airflow control devices includes differently sized apertures configured to control the airflow through the respective air bypass channels.

9. The particulate material delivery system of claim 7, wherein the airflow control device includes differently sized apertures configured to control the airflow through the respective air bypass channels.

10. The particulate material delivery system of claim 1, wherein the air bypass channel is substantially perpendicular to an air supply chamber, the air supply chamber is configured to provide the airflow from an airflow supply, and the air supply chamber directs the airflow into the air bypass channel through the airflow control device.

11. The particulate material delivery system of claim 1, wherein the airflow control device comprises a baffle.

12. The particulate material delivery system of claim 1, wherein the airflow control device comprises a plug configured to be inserted into the air bypass channel.

* * * * *